US007546554B2

(12) United States Patent
Chiu et al.

(10) Patent No.: US 7,546,554 B2
(45) Date of Patent: Jun. 9, 2009

(54) SYSTEMS AND METHODS FOR BROWSING MULTIMEDIA CONTENT ON SMALL MOBILE DEVICES

(75) Inventors: Patrick Chiu, Menlo Park, CA (US); Maryam Kamvar, New York, NY (US); Tohru Fuse, Santa Clara, CA (US); Surapong Lertsithichai, Mountain View, CA (US); Sandeep Casi, Tiburon, CA (US); Lynn D. Wilcox, Palo Alto, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 510 days.

(21) Appl. No.: 10/814,520

(22) Filed: Mar. 31, 2004

(65) Prior Publication Data

US 2005/0229118 A1    Oct. 13, 2005

(51) Int. Cl.
*G06F 3/14* (2006.01)

(52) U.S. Cl. .................. 715/864; 715/768; 715/733; 715/760; 715/719; 715/720; 715/721; 715/722; 715/723; 715/790; 715/794

(58) Field of Classification Search ............. 715/864, 715/733, 760, 513, 501, 768, 719, 720, 721, 715/722, 723, 790, 794
See application file for complete search history.

(56) References Cited

U.S. PATENT DOCUMENTS 5,598,557 A * 1/1997 Doner et al. .................... 707/5
5,651,107 A * 7/1997 Frank et al. ................. 715/768
5,933,141 A * 8/1999 Smith .......................... 725/39
6,429,883 B1 * 8/2002 Plow et al. ................. 715/768
2003/0090495 A1 * 5/2003 Tomita ....................... 345/619
2004/0221322 A1 * 11/2004 Shen et al. .................. 725/135

FOREIGN PATENT DOCUMENTS

EP    990998 A2 *    4/2000

* cited by examiner

*Primary Examiner*—Weilun Lo
*Assistant Examiner*—Rashedul Hassan
(74) *Attorney, Agent, or Firm*—Fliesler Meyer LLP

(57) ABSTRACT

The multimedia content browsing system for small mobile devices smoothly blends three key tasks: querying the multimedia contents by keywords, exploring the search results by viewing keyframes of the multimedia contents, and playing a stream of the multimedia contents, e.g., videos or video segments. Videos can be stored in a segment-based multimedia content database, which is designed to support the browsing, retrieval, and reuse of videos. A layered imaging model is introduced where each layer may have its own transparent value set individually, continuously, and interactively, and the layers can overlap on top of each other when rendered on the screen. Since a small mobile device alone may not have enough resources to handle the entire task of multimedia content browsing, a scalable architecture can be adopted to break up the task among the small mobile device, a Hard Disk Drive (HDD), and a resource-rich computing device.

32 Claims, 9 Drawing Sheets

| Keyframe image of | | Composite keyframes | | |
| --- | --- | --- | --- | --- |
| Segment A | Segment B | 25% | 50% | 75% |
| The 1st frame  |  |  |  |  |
| The most characteristic frame  |  |  |  |  |
| The last frame  |  | | | |

SYSTEMS AND METHODS FOR BROWSING MULTIMEDIA CONTENT ON SMALL MOBILE DEVICES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE DISCLOSURE

The present disclosure relates to the storing, processing, and browsing of multimedia data.

BACKGROUND

Current advances in mobile and wireless technology are making it easier to access multimedia contents anywhere and anytime. A multimedia content can include, but is not limited to, a video, a video segment, a keyframe, an image, a graph, a figure, a drawing, a picture, a text, a keyword, and other suitable contents. The cutting edge technology provides the possibility to watch multimedia contents on a small mobile device, which can be, but is not limited to, a PDA, a cell phone, a Tablet PC, a Pocket PC, and other suitable electronic devices. The small mobile device can utilize an associated input device such as a pen or a stylus to interact with a user. However, it is challenging to browse multimedia content on the small mobile device for a number of reasons. First, the small screen area of such device restricts the amount of multimedia content that can be displayed; Second, user interaction tends to be more tedious on the small mobile device, and the limited responsiveness of the current generation of such devices is another source of aggravation; Third, due to bandwidth and performance issues, it is necessary to carefully select the portions of the multimedia content to transmit over a network. Furthermore, despite the high portability and flexibility of the small mobile devices serving as mobile multimedia terminals, how they handle and process multimedia contents huge in term of number of bytes generally is a big challenge, because the resources of these small mobile devices are potentially limited.

BRIEF SUMMARY OF THE INVENTION

The multimedia content browsing system for small mobile devices smoothly blends three key tasks: querying the multimedia contents by keywords, exploring the search results by viewing keyframes of the multimedia contents, and playing a stream of the multimedia contents, e.g., videos or video segments. Videos can be stored in a segment-based multimedia database, which is designed to support the browsing, retrieval, and reuse of videos. A layered imaging model is introduced where each layer may have its own transparent value set individually, continuously, and interactively, and the layers can overlap on top of each other when rendered on the screen. Since a small mobile device alone may not have enough resources to handle the entire task of multimedia content browsing, a scalable architecture can be adopted to break up the task among the small mobile device, a Hard Disk Drive (HDD), and a resource-rich computing device.

DETAILED DESCRIPTION

The invention is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

Systems and methods in accordance with the present invention enable the browsing of multimedia contents on small mobile devices. They smoothly blend three key tasks of multimedia content browsing: querying the multimedia contents by keywords, exploring the search results by viewing keyframes of the multimedia contents, and playing a stream of the multimedia contents, e.g., videos or video segments. During each task, only the necessary portions (e.g., titles, keyframes, video segments) of the multimedia contents are retrieved and rendered, thereby putting less demand on a communication network, which can be, but is not limited to, Internet, an intranet, a local area network, a wireless network, a Bluetooth network, and other suitable concepts. Videos can be stored in a segment-based multimedia content database, which is designed to support the browsing, retrieval, storage and reuse of multimedia contents, such as videos. A layered imaging model is introduced in order to browse the multimedia contents effectively on the small screen area, and as a way to transition between tasks. Each layer may have its own transparent value set individually, continuously, and interactively, and the layers can overlap on top of each other when rendered on the screen.

Since a small mobile device alone may not have enough resources to handle the entire task of multimedia content browsing, a scalable architecture can be adopted to break up the task using the small mobile device as a browsing component, a Hard Disk Drive (HDD) hosting a multimedia content database, and a resource-rich computing device as a processing component. Here, the resource-rich computing device can include, but is not limited to, a desktop PC, a laptop PC, a workstation, a server and a mainframe computer; the HDD can be, but is not limited to one of: an external HDD, a portable HDD, a wireless HDD, a Bluetooth HDD, and an internal HDD on a resource-rich computing device.

The application software used by the multimedia content browsing system can be implemented in Java, wherein Java2D is used to support the rendering of the layers, and QuickTime for Java is used to play the stream of contents.

Figure 1:
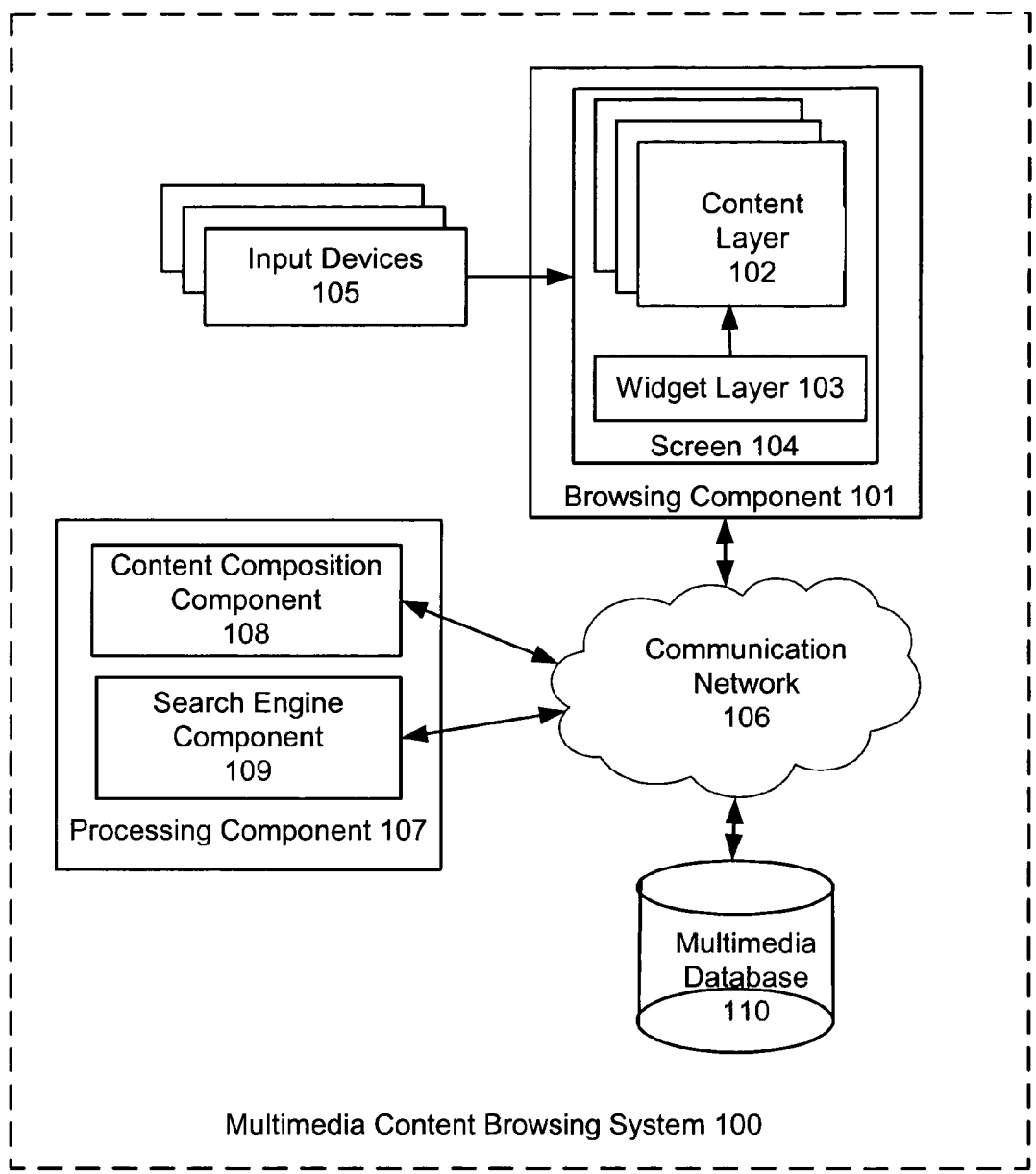
FIG. 1 is an illustration of an exemplary multimedia content browsing system in accordance with one embodiment of the invention.

FIG. 1 is an illustration of an exemplary system in an embodiment of the present invention. Although this diagram depicts objects/processes as logically separate, such depiction is merely for illustrative purposes. It will be apparent to those skilled in the art that the objects/processes portrayed in this figure can be arbitrarily combined or divided into separate software, firmware and/or hardware components. Furthermore, it will also be apparent to those skilled in the art that such objects/processes, regardless of how they are combined or divided, can execute on the same computing device or can be distributed among different computing devices connected by one or more networks or other suitable communication means.

Within the exemplary multimedia content browsing system 100 in FIG. 1, a browsing component 101 is capable of rendering one or more layers 102 of multimedia contents, such as videos or video segments, on a screen 104. The transparency values of each of the one or more layers can be set interactively using a widget layer 103, which is operable via one or more input devices 105. The browsing component communicates with a processing component 107 via a communication network 106. During the query task, a search engine component 109 in the processing component retrieves multimedia contents from a multimedia content database 110, such contents may contains keyframes and metadata of the text and keywords associated with the contents. During the exploration and/or content playing task, a content composition component 108 transmits the multimedia contents back to the browsing component for rendering, after necessary composition, animation, and storage of the contents.

Figure 2:
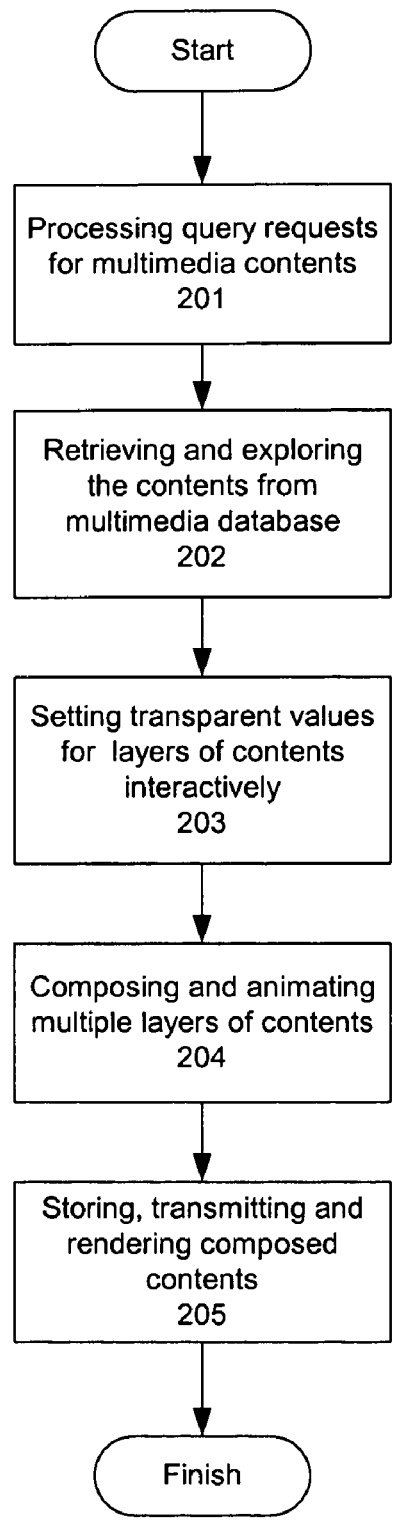
FIG. 2 is a flow chart illustrating an exemplary multimedia content browsing process in accordance with one embodiment of the invention.

FIG. 2 is a flow chart illustrating an exemplary multimedia content browsing process in accordance with one embodiment of the invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 2, the query from a user requesting multimedia contents is processed at step 201. The multimedia contents are then retrieved from the multimedia content database and explored at step 202. At step 203, the transparency values are set for multiple layers of contents, e.g. title list, and keyframes. These contents can then be composed and animated at step 204, if necessary, using the set transparency values at step 203. These composed contents can be stored in the multimedia content database before being transmitted and rendered for display at step 205.

In some embodiments, the multimedia content database is designed to support the retrieval of a video by keyword query. In a typical database, keywords are associated with the video as a whole. In some embodiments, for example, if keywords are obtained from a time-aligned translation, keywords may be associated with particular timestamps, which are actually part of the metadata associated with the video (each multimedia content in the multimedia content database has at least one timestamp, allowing multimedia contents such as images or texts to serve as indexes or links into other multimedia contents, e.g., videos). Keyword-based video retrieval from this type of database results in a list of relevant videos, with optional marks showing where keywords occur in each of the videos.

In some embodiments, the multimedia content database is segment-based to support browsing, retrieval, and reuse of a video by segments. The video is first segmented, either manually or using any standard automatic video segmentation algorithm. Keywords are associated with each of these video segments, either by manually annotating the segments or by associating time-stamped keywords with the corresponding segments. A keyword query results in a list of relevant segments. Relevance is determined based on the number of occurrences of the keyword in the segment, where the number is possibly weighted. A relevance score for an entire video is computed as the sum of the relevance scores of all of its component segments. Thus a keyword query can result in an ordered list of all relevant videos, with information on the relevance of the segments in each of the videos.

Figure 3:
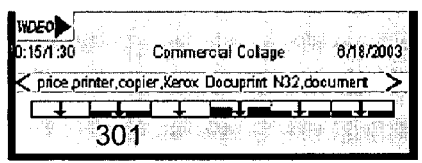
FIG. 3(a)-(c) are illustrations of a multimedia content composed from other multimedia contents in accordance with one embodiment of the invention.
Figure 3:
Figure 3:
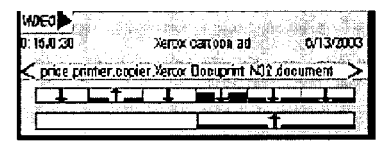

In some embodiments, the segment-based multimedia content database is also designed to support reuse of video segments. Using an editing application, users can create a video by concatenating segments from multiple source videos retrieved from the database. The database keeps track of the source of a video where segments from multiple videos in the database are re-used to create the video. The graphical representation of the presence of a source video associated with a video segment 301 is indicated with a black, downward-pointing arrow, as shown in FIG. 3(a). Gesturing down (FIG. 3(b)) on the video segment expands the view to show the source video of that segment, shown as 302 in FIG. 3(c), and gesturing up collapses the view. The composed video is stored back into the multimedia content database, and its segments contain links to the source video that the segment was taken from.

In some embodiments, the browsing component provides effective features to browse multiple segments of videos on the screen of a small mobile device. These features are based on a layered image model, comprising one or more content layers and a widget layer on the browsing component to set the gradient transparency values of the layers. Two or more content layers can be overlapped on top of each other, and the tasks of query, exploration, and playing of segmented multimedia contents can be switched smoothly among each other. By considering the whole process as an integration of several tasks rather than a bunch of isolated tasks, the browsing component makes the interaction with users less haphazard and more fluid.

Figure 4:
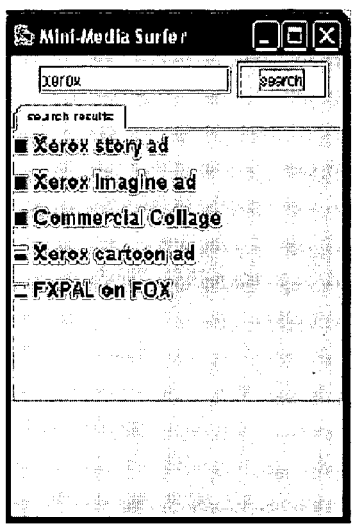
FIG. 4(a)-(c) are illustrations of exemplary content layers in accordance with one embodiment of the invention.
Figure 4:
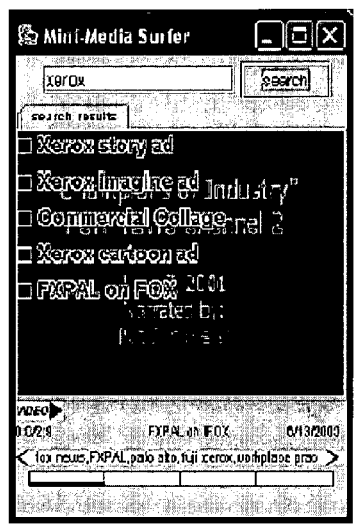
Figure 4:
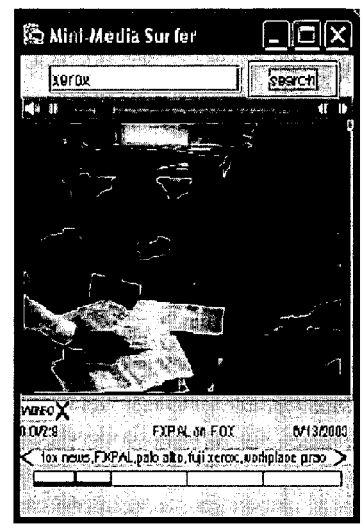

In some embodiments, the browsing component supports the query of, e.g., segmented videos, by keywords. A simple text box, in a style used by a search engine such as Google™, accepts keywords from the input devices and searches the segmented videos in the segment-based multimedia content database. The search results are displayed as a list of video titles on a first content layer, which can be visible in any opaque color, as shown in FIG. 4(a). On the left margin of each title is a bar whose height indicates the relevance score for that video.

In some embodiments, the browsing component supports the task of exploring the search results generated by the keyword query. Such exploration involves checking the promising query results in the list and looking at their keyframes by selecting videos in the list one at a time. The selected video is highlighted in red, and a second content layer, which is transparent, appears showing a keyframe from the selected video, as shown in FIG. 4(b). This keyframe can be one of the first frame of the video, the last frame of the video, and the most characteristic frame of the video that is extracted by a standard video segmentation algorithm. Notice that the first content layer now becomes transparent and on top of the second content layer, and both are visible.

In some embodiments, the transparency values of the first content layer showing the query results and the second content layer showing the keyframe are automatically changed to make it possible to see both layers when they are overlaid on top of each other during the transitioning from query to exploration. The transparency value of the first layer drops from 1.0 to alpha 1, and the transparency value of the second layer rises from 0.0 to alpha 2, where the effect of alpha 1=alpha 2=0.8 is shown in FIG. 4(b).

In some embodiments, the transparency values of the two layers can be adjusted manually and in continuous gradient values. Sometimes it is desirable to adjust the transparency values to see better either the query result on the first content layer or the keyframe on the second content layer. For a small mobile device used under different lighting conditions, having greater visual separation between the layers may be more helpful than just uniformly changing the display's brightness or contrast.

Figure 5:
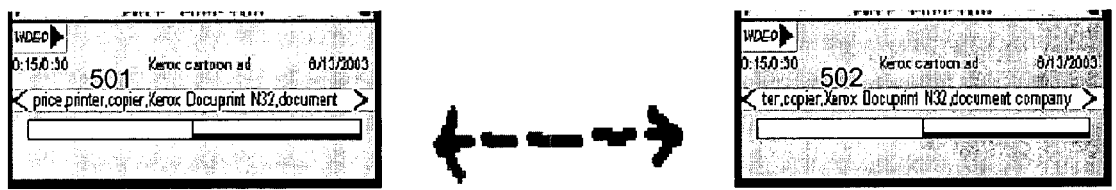
FIG. 5(a)-(c) are illustrations of keywords associated with a multimedia content in accordance with one embodiment of the invention.

In some embodiments, the segments of the video are visualized by a graphical representation at the bottom part of the screen, and each segment has a bar whose height indicates its relevance. The keywords associated with the selected video 501 are shown at the bottom of the screen above the segment bars in FIG. 5(a). The user can scroll the set of keywords by gesturing left or right on top of the keywords, as shown in FIG. 5(b), and the result 502 after scrolling is shown in FIG. 5(c).

In some embodiments, the browsing component supports the playing of a stream of contents, when some interesting video segments are found. There are several ways to play the video:

Tapping on a selected video plays that video from the beginning;
Tapping on a segment of a video plays the video from the first frame of that segment;
Tapping on a segment in the expanded segment view plays from that source segment's first frame.

The transition from exploration to content playing is made smooth by playing the video "in-place" of the keyframe, and hiding the query results. The visual effect is that the second content layer switches from a transparent keyframe layer to become an opaque video layer, and the first content layer is faded out. As the result, only the second content layer is visible, as shown in FIG. 4(c).

In some embodiments, a small video controller is activated on the top edge of the video layer, and users can stop, pause, or jump to another video segment on the time slider. Users can also tap on the segments on the bottom of the screen to jump to another part of the video.

Figure 6:
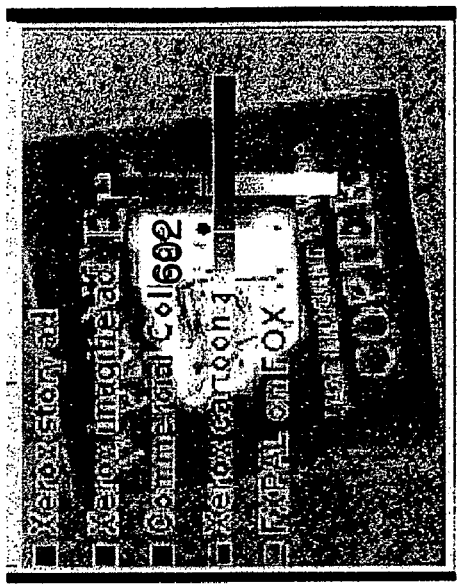
FIG. 6(a)-(c) are illustrations of an exemplary widget layer in accordance with one embodiment of the invention.
Figure 6:
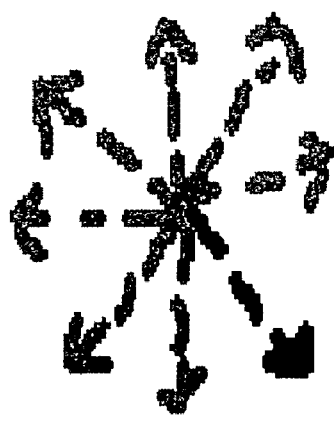
Figure 6:
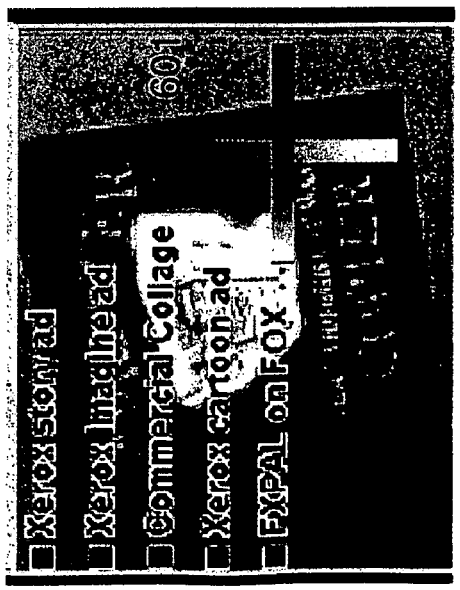

In some embodiments, the browsing component accepts a gesture made via an input device such as a stylus anywhere over a content layer to adjust its transparency value continuously. If the stylus is held down before gesturing, the widget layer showing transparent gradient appears, as shown in FIG. 6(a), where the dot 601 shows the current transparency values (x=first content layer, y=second content layer). Gesturing to the right (FIG. 6(b)) decreases the transparency of the first content layer and gesturing to the left increases it. Similarly, gesturing up decreases the transparency of the second content layer and gesturing down increases it. The result after the gesturing is shown in FIG. 6(c), where the dot 602 shows the current transparency values of the two content layers.

Figure 7:
FIG. 7 is an illustration of the composition of keyframes from two multimedia contents in accordance with one embodiment of the invention.
Figure 7:
Figure 7:
Figure 7:
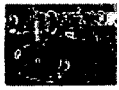
Figure 7:
Figure 7:
Figure 7:
Figure 7:
Figure 7:
Figure 7:
Figure 7:
Figure 7:

In some embodiments, the processing component is capable of carrying out the heavy duty tasks of image processing, such as the searching and retrieving of multimedia contents from the multimedia content database, the composition and/or animation of multiple layers of contents, e.g. keyframes, using the transparency values of the layers set by the user. FIG. 7 illustrates the composition of keyframes in accordance with some embodiments of the present invention. Here keyframes are extracted from video segments A and B, respectively, and the transparent ratios between the transparency values of content layers showing keyframes from A and B are set as 25%, 50%, and 75%, respectively. The content composition component generates the composed and/or animated images for each of these three keyframes at each of the three transparent ratios, using any standard image composition and/or animation algorithm.

In some embodiments, the composed contents of the three keyframes of a video or a video segment are also stored in the multimedia content database, in addition to the actual video or video segment. If the number of videos or video segments under exploration is N, for example, then at least $3*N(N-1)/2$ of the composed contents should be generated. The composed contents can also be transmitted over the communication network and rendered on a content layer on the browsing component.

In some embodiments, the task of browsing multimedia contents using the multimedia content database, the browsing component, and the processing component has to be distributed among multiple computing devices using a scalable architecture. A small mobile device, which is often used as the browsing component, usually does not have enough storage to store multimedia contents such as videos on its own body. A large amount of Compact Flash memory or a Micro Drive would increase the storage area of the small mobile device, but it's still not enough to handle a large volume of multimedia contents. In addition, the small mobile device also lacks processing power to compose keyframes of contents and generating animations. Besides, the multimedia content database usually runs on an HDD in a high performance server placed in a data center. Therefore, if a small mobile device needs to browse a video that is stored in the multimedia content database, or it needs to view composed images of keyframes generated dynamically, it needs to access one or more computing devices remotely through a communication network. On the other hand, recent high performance laptop PC has enough power to compose images and generate animation in real time and is often used as the processing component, which traditionally has to be a desktop PC, a workstation, a server, or a mainframe computer. Therefore, the scalable architecture can be constructed with, for example, the combination of a wireless HDD, a desktop PC, a portable laptop PC, a communication network, and a small mobile device. Three types of configurations of the scalable architecture to handle the browsing of multimedia contents on a small device are described as Pocket, Portable, and Network.

In some embodiments, the Pocket configuration is adopted, which comprises a wireless (Bluetooth) HDD 802 to host the multimedia content database, a desktop PC 803 as the processing component, and a small mobile device like a PDA 801 as the browsing component, as shown in FIG. 8(a). Such configuration enables making the small mobile device to watch multimedia contents in handheld style. The desktop PC composes keyframe images for the video, and then generates animation that consists of the composed images. The wireless HDD stores the actual multimedia contents, and also the composed contents that the desktop PC previously generated. A small mobile device is capable of playing a stream of video content through a wireless network, such as Bluetooth.

Figure 8:
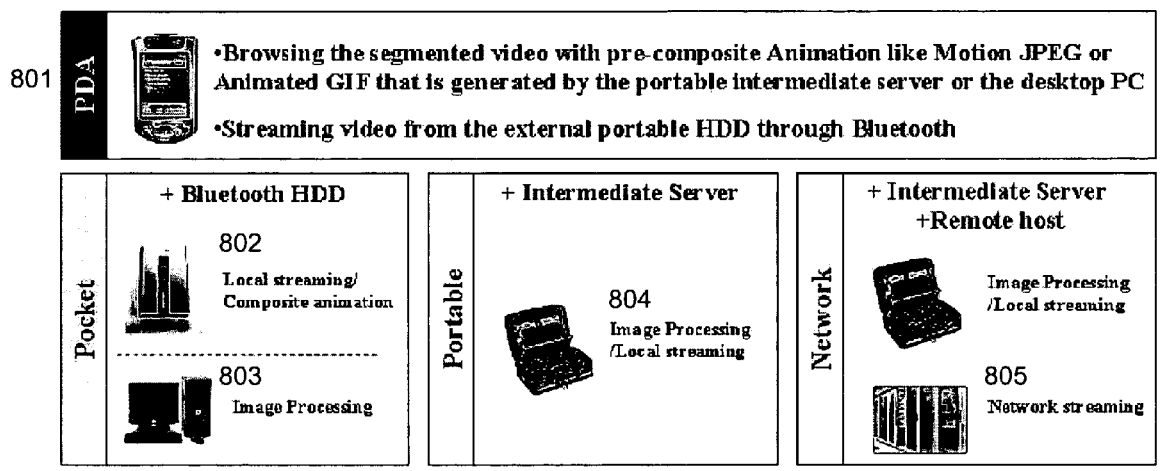
FIG. 8(a)-(c) are illustrations of exemplary configurations of scalable architectures in accordance with one embodiment of the invention.
Figure 9:
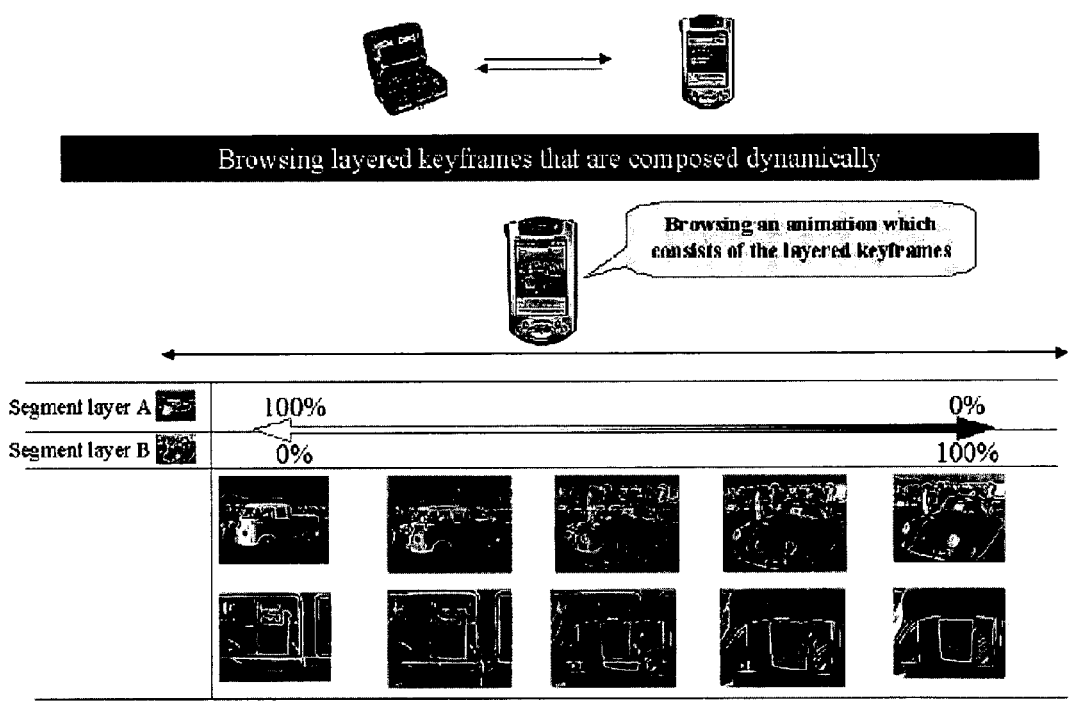
FIG. 9 is an illustration of an exemplary multimedia content browsing system in accordance with one embodiment of the invention.

In some embodiments, the Portable configuration is adopted, which comprises a high performance laptop PC 804 as the processing component, the HDD of the high performance laptop PC to host the multimedia content database, and a small mobile device like a PDA as the browsing component, as shown in FIG. 8(*b*). The laptop PC generates the composed and animated contents in real time on each request from PDA dynamically, as shown in FIG. 9.

In some embodiments, the Network configuration is adopted, which in addition to the Portable configuration, further comprises a server 805 that is placed at a data center to host the multimedia content database, as shown in FIG. 8(*c*). The small mobile device can communicate with the laptop PC through a wireless network like Bluetooth, and the laptop PC can communicate with the server in the data center through Internet.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more computing devices to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Particularly, while the concept "keyframe" is used in the embodiments of the systems and methods described above, it will be evident that such concept can be interchangeably used with equivalent concepts such as image, and other suitable concepts. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A system to support multimedia content browsing on a mobile device, comprising:
a browsing component software application a microprocessor executing in the mobile device, wherein the mobile device comprises a display screen;
wherein the browsing component renders a keyword query text box in a first area of the display screen, multimedia contents in a second area of the display screen, and a video controller in a third area of the display screen;
wherein the multimedia contents are rendered on overlapping content layers within the second area of the display screen, the content layers comprising a first content layer that renders query results, a second content layer that renders keyframes, and a third content layer that renders videos, wherein the content layers always overlap each other in totality throughout the entire area of the second area of the display screen;
wherein the browsing component further renders a transparent widget layer on the display screen, the transparent widget layer being completely transparent within the display screen until activated by a user, wherein the transparent widget layer independently, interactively and continuously adjusts the degree of transparency of two or more of the content layers via an input device, wherein transparency values for the content layers comprise continuous gradient values between 0.0 and 1.0, a content layer having a transparency value of 0.0 being completely transparent and a content layer having a transparency value of 1.0 being completely opaque; and
wherein the browsing component receives the multimedia contents from a processing component based on a keyword query, wherein the processing component searches for and retrieves the multimedia contents relevant to the keyword query from a multimedia content database, wherein the processing component transmits the multimedia contents relevant to the keyword query to the browsing component over a communication network.

2. The system according to claim 1, wherein:
the multimedia content database comprises an external hard disk drive (HDD), a portable HDD, a wireless HDD, a Bluetooth HDD, and an internal HDD on a resource-rich computing device.

3. The system according to claim 1, wherein:
the multimedia contents comprises a video, a video segment, a keyframe, an image, a figure, a drawing, a graph, a picture, a text, and a keyword.

4. The system according to claim 1, wherein:
the processing component comprises a laptop PC, a desktop PC, a server, a workstation, and a mainframe computer.

5. The system according to claim 1, wherein:
the communication network comprises Internet, an intranet, a local area network, a wireless network, and a Bluetooth network.

6. The system according to claim 1, wherein the processing component:
composes and animates the multimedia contents using the transparency values of the multimedia contents; and
saves the composed content in the multimedia content database and transmits the composed content to the browsing component.

7. The system according to claim 1, wherein:
the mobile device comprises a PDA, a cell phone, a Tablet PC, and a Pocket PC.

8. The system according to claim 1, wherein:
the input device comprises a pen, and a stylus.

9. A computer-implemented method to support multimedia content browsing on a mobile device, comprising:
  rendering a keyword query user interface in a first area of a display screen of the mobile device;
  searching for and retrieving two or more multimedia contents from a multimedia content database based on user input received through the keyword query user interface of the mobile device;
  transmitting the two or more multimedia contents over a communication network to the mobile device;
  rendering the multimedia contents in a second area of the display screen, wherein the multimedia contents are rendered on overlapping content layers within the second area of the display screen, the content layers comprising a first content layer that renders query results, a second content layer that renders keyframes, and a third content layer that renders videos, wherein the content layers always overlap each other in totality throughout the entire area of the second area of the display screen;
  rendering a video controller in a third area of the display screen; and
  receiving user input from an input device on a widget layer rendered on the display screen, the transparent widget layer being completely transparent within the display screen until activated by a user, wherein the transparent widget layer independently, interactively and continuously adjusts the degree of transparency of two or more of the content layers via an input device, wherein transparency values for the content layers comprise continuous gradient values between 0.0 and 1.0, a content layer having a transparency value of 0.0 being completely transparent and a content layer having a transparency value of 1.0 being completely opaque.

10. The method according to claim 9, further comprising at least one of:
  segmenting the two or more multimedia contents into one or more video segments;
  associating one or more keywords with each of the video segments;
  retrieving the two or more multimedia contents and each of the associated video segments with a keyword.

11. The method according to claim 10, further comprising:
  composing the multimedia contents with one or more video segments from one or more source multimedia contents.

12. The method according to claim 9, further comprising:
  composing and animating the contents of the two or more multimedia contents using the transparency values; and
  storing the composed content in the multimedia content database and transmitting the composed content for rendering.

13. A machine readable medium having executable instructions stored thereon that when executed cause a system to:
  render a keyword query text box in a first area of a display screen of the mobile device;
  search for and retrieve two or more multimedia contents from a multimedia content database based on user input received through the keyword query text box of the mobile device;
  transmit the two or more multimedia contents over a communication network to the mobile device;
  render the multimedia contents in a second area of the display screen, wherein the multimedia contents are rendered on overlapping content layers within the second area of the display screen, the content layers comprising a first content layer that renders query results, a second content layer that renders keyframes, and a third content layer that renders videos, wherein the content layers always overlap each other in totality throughout the entire area of the second area of the display screen;
  render a video controller in a third area of the display screen; and
  receive user input from an input device on a widget layer rendered on the display screen, the transparent widget layer being completely transparent within the display screen until activated by a user, wherein the transparent widget layer independently, interactively and continuously adjusts the degree of transparency of two or more of the content layers via an input device, wherein transparency values for the content layers comprise continuous gradient values between 0.0 and 1.0, a content layer having a transparency value of 0.0 being completely transparent and a content layer having a transparency value of 1.0 being completely opaque.

14. The machine readable medium of claim 13, further comprising instructions that when executed cause the system to:
  segment the two or more multimedia contents into one or more video segments;
  associate one or more keywords with each of the video segments;
  retrieve the two or more multimedia contents and each of the video segments with a keyword.

15. The machine readable medium of claim 14, further comprising instructions that when executed cause the system to:
  compose the multimedia contents with one or more video segments from one or more source multimedia contents.

16. The machine readable medium of claim 13, further comprising instructions that when executed cause the system to:
  compose and animate the contents of the two or more multimedia contents using the transparency values; and
  store the composed content in the multimedia content database and transmit the composed content for rendering.

17. The system of claim 1:
  wherein the first content layer comprises a list of the video titles received from the processing component; and
  wherein upon reception of a selection of one of the video titles, the keyframe associated with the selected video title is rendered on the second content layer.

18. The system of claim 17:
  wherein the default transparency values for both the first content layer and the second content layer are 0.8.

19. The system of claim 17:
  wherein the video associated with the selected video title is played by the browser component on the third content layer; and
  wherein the first content layer and the second content layer are completely transparent when the selected video is being played.

20. The system of claim 19:
  wherein the video controller is activated and displayed within the third area of the display screen as the selected video is being played within the second area of the display screen, the video controller comprising a graphical user interface that allows the user to stop, pause, play and jump to other parts of the video using the input device.

21. The system of claim 17:
  wherein the keyframe associated with the selected video title comprises two or more frames overlapping each other in totality, each frame having a transparency value which allows each frame to be visible.

22. The system of claim 20:
wherein the video associated with the selected video title comprises two or more video segments;
wherein keywords are associated with each video segment; and
wherein the video controller includes:
a graphical representation of each video segment of the video associated with the selected video title;
a bar within each graphical representation, the height of the bar indicating the relevance of the associated video segment to the keyword query; and
a text box which displays the keywords associated with the video segments.

23. The system of claim 22:
wherein the video associated with the selected video title includes video segments obtained from different source videos;
wherein the video controller comprises a graphical indicator when the source video is present within the multimedia content database; and
wherein the source video is displayed upon selection of the associated graphical indicator.

24. The method of claim 9, further comprising:
wherein the two or more multimedia contents includes videos, each video having a video title and a keyframe associated with the video;
rendering a list of the video titles associated with the relevant multimedia contents on the first content layer within the second area of the display screen;
receiving user input to select one of the video titles rendered on the first content layer; and
rendering the keyframe associated with the selected video title on the second content layer within the second area of the display screen.

25. The method of claim 24, further comprising:
playing the video associated with the selected video title, wherein the first content layer and the second content layer are completely transparent while the selected video is being played.

26. The method of claim 25, further comprising:
activating and displaying the video controller when the selected video is being played, the video controller being a graphical user interface that allows the user to stop, pause, play and jump to other parts of the video being played.

27. The method of claim 24, further comprising:
receiving user input to adjust the transparency values of the first content layer and the second content layer using the input device on the widget layer, wherein the transparency values for the first content layer can be adjusted by making a horizontal gesture over the widget layer using the input device and the transparency values for the second content layer can be adjusted by making a vertical gesture over the widget layer using the input device.

28. The machine readable medium of claim 13, further comprising instructions that when executed cause the system to:
wherein the two or more multimedia contents includes videos, each video having a video title and a keyframe associated with the video;
render a list of the video titles associated with the relevant multimedia contents on the first content layer within the second area of the display screen;
receive user input to select one of the video titles rendered on the first content layer; and
render the keyframe associated with the selected video title on the second content layer within the second area of the display screen.

29. The machine readable medium of claim 28, further comprising instructions that when executed cause the system to:
play the video associated with the selected video title, wherein the first content layer and the second content layer become completely transparent while the selected video is being played.

30. The machine readable medium of claim 29, further comprising instructions that when executed cause the system to:
activate and display the video controller when the selected video is being played, the video controller being a graphical user interface that allows the user to stop, pause, play and jump to other parts of the video being played.

31. The machine readable medium of claim 28, further comprising instructions that when executed cause the system to:
receive user input to adjust the transparency values of the first content layer and the second content layer using the input device on the widget layer, wherein the transparency values for the first content layer can be adjusted by making a horizontal gesture over the widget layer and the transparency values for the second content layer can be adjusted by making a vertical gesture over the widget layer.

32. The system according to claim 1, wherein the display screen comprises a touch screen, wherein the browsing component receives user input through gestures made on the touch screen.

* * * * *